United States Patent [19]

Jackson

[11] Patent Number: 4,689,681
[45] Date of Patent: Aug. 25, 1987

[54] TELEVISION SPECIAL EFFECTS SYSTEM

[75] Inventor: Richard A. Jackson, Nevada City, Calif.

[73] Assignee: The Grass Valley Group, Inc., Grass Valley, Calif.

[21] Appl. No.: 922,906

[22] Filed: Oct. 24, 1986

[51] Int. Cl.[4] ..................... H04N 5/272; H04N 5/262
[52] U.S. Cl. ..................................... 358/183; 358/22
[58] Field of Search .................. 358/183, 182, 180, 22

[56] References Cited

U.S. PATENT DOCUMENTS

| | | | |
|---|---|---|---|
| 3,673,324 | 6/1972 | Ito et al. | 358/22 |
| 4,041,527 | 8/1977 | Rayner et al. | 358/22 |
| 4,109,278 | 8/1978 | Mendrala et al. | 358/22 |
| 4,121,253 | 10/1978 | McCoy | 358/183 X |
| 4,178,613 | 12/1979 | Takahashi et al. | 358/183 |
| 4,249,212 | 2/1981 | Ito et al. | 358/183 |
| 4,302,776 | 11/1981 | Taylor et al. | 358/180 X |
| 4,334,245 | 6/1982 | Michael | 358/180 X |
| 4,409,611 | 10/1983 | Vlahos | 358/22 |
| 4,432,009 | 2/1984 | Reitmeier et al. | 358/22 |
| 4,463,372 | 7/1984 | Bennett et al. | 358/22 |
| 4,468,688 | 8/1984 | Gabriel et al. | 358/22 |
| 4,472,732 | 9/1984 | Bennett et al. | 358/22 |
| 4,563,703 | 1/1986 | Taylor et al. | 358/22 X |

Primary Examiner—Michael A. Masinick
Assistant Examiner—E. Anne Toth
Attorney, Agent, or Firm—John Smith-Hill

[57] ABSTRACT

An input video signal representative of a scene is processed by carrying out a spatial transform operation on the input video signal so as to generate a transformed video signal. Concurrently, an input key signal representing the opacity of the scene and comprising a stream of digital data words is written into a key frame buffer. A first sequence of address words is generated, and a transform operation is carried out on the first sequence of address words so as to generate a second sequence of address words. The second sequence of address words is used to read digital data words from the key frame buffer so as to generate a first transformed key signal. The transform that was carried out on the first sequence of address words is such that the first transformed key signal is spatially transformed with respect to the input key signal in the same manner as the transformed video signal is spatially transformed with respect to the input video signal. The second sequence of address words is modified so as to generate a third sequence of address words, and the third sequence of address words is used to read digital words from the key frame buffer and generate a second transformed key signal. The transformed video signal is combined with the first and second transformed key signals.

15 Claims, 14 Drawing Figures

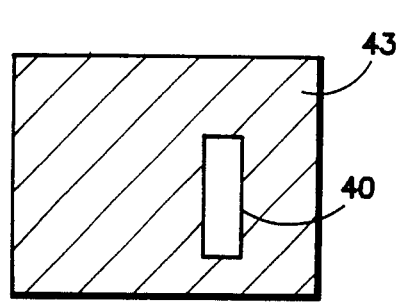
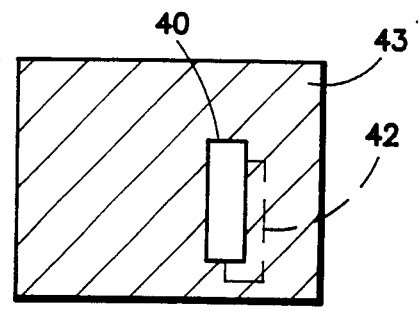
FIG. 3(a)   FIG. 3(b)
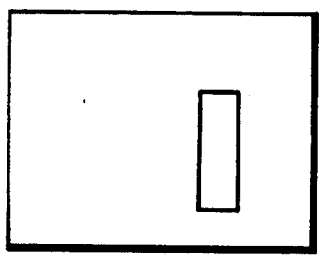
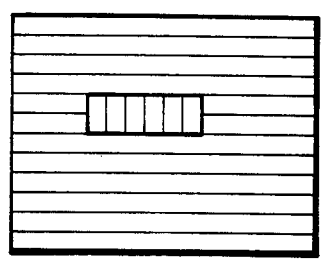
FIG. 5(a)   FIG. 5(b)
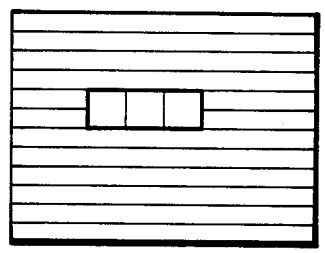
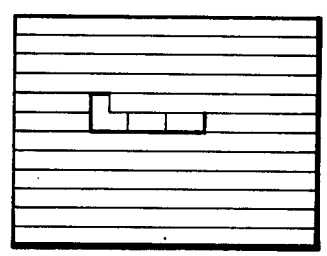
FIG. 5(c)   FIG. 5(d)
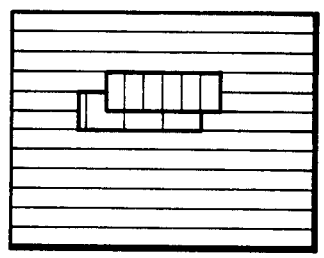
FIG. 5(e)

TELEVISION SPECIAL EFFECTS SYSTEM

This invention relates to a television special effects system.

BACKGROUND OF THE INVENTION

A television picture is a representation in substantially planar form of a scene that is composed by the producer of a television program. The scene may be composed of tangible objects, or it may be at least partially synthesized by artificial means, e.g. a television graphics system, so that the source of the video signal representing the scene is not a camera or a film scanner but a frame buffer and a computer used for adjusting the contents of the frame buffer. Generally, the scene is made up of two component scenes, namely a foreground scene and a background scene, that are combined using a travelling matte technique. For example, the foreground scene might contain an annulus against a solid color matte and the background scene a square against a screen of contrasting color, as shown in FIGS. 1(a) and 1(b) respectively, so that when the foreground and background scenes are combined the resulting picture has the appearance shown in FIG. 1(c).

A transform system operates on the video signal representing a scene, and may be used to carry out a spatial transformation on the scene. For example, the scene may be displaced to the right. If the foreground video signal representing the FIG. 1(a) scene is applied to a transform system which carries out a transformation on the signal such that the transformed signal represents the scene shown in FIG. 1(d), in which the annulus of the FIG. 1(a) scene has been shifted to the right, then the signal obtained by combining the transformed foreground signal with the background signal might represent the picture shown in FIG. 1(e). Most transform systems are of two main kinds, known as the forward transform system and the reverse transform system. FIG. 2 represents a frame-based reverse transform system based on principles that are known at present. It is believed that the FIG. 2 system does not exist in the prior art, and it is being described in order to provide information that will be useful in understanding the invention.

The transform system shown in FIG. 2 operates by digitizing the input video signal under control of a write clock 10 and writing the resulting sequence of digital words, each having, e.g. ten bits into a video frame buffer 12 using addresses generated by a forward address generator 14. The input video signal is derived from an analog composite video signal in conventional interlaced format by separating it into its components (normally luminance and chrominance) and digitizing each component. The frame buffer 12 therefore comprises a memory for storing the luminance component and a memory for storing the chrominance components. However, since the components are acted on in like manner in the transform system, it is not necessary to consider the components separately. The operation of digitizing the video signal effectively resolves each raster line of the picture into multiple pixels, e.g. 720 pixels, that are small, but finite, in area. The location of a pixel in the scene can be defined by a two-coordinate display address (U, V) of the input screen (FIG. 1(a), e.g.). The address space of the video frame buffer is organized so that there is a one-to-one correspondence between the display addresses and the memory addresses generated by the forward address generator 14. Thus, the digital word representing the pixel having the input scene display address (U, V) is written into the frame buffer 12 at a location that has a memory address that can be expressed as (U, V). The frame buffer has three field memories, one of which is written to and the other two of which are read from. The frame buffer is able to store three video fields each containing about 242 active lines in the NTSC system.

In order to read an output video signal from the frame buffer 12, a read address counter 16 operates under control of a read clock 17 to generate a sequence of output scene display addresses (X, Y) defining the locations in the output screen (FIG. 1(d)) of the pixels that will be successively addressed. The coordinate values X and Y each have the same number of significant digits as the coordinate values U and V respectively. Accordingly, the display addresses (X, Y) define the same possible pixel positions in the output display space as are defined in the input display space by the display addresses (U, V). However, the display addresses (X, Y) are not used directly to read the output video signal from the frame buffer. A reverse address generator 18 receives the output scene display addresses (X, Y) and multiplies them by a transform matrix T' to generate corresponding memory addresses (X', Y') which are used to read the video signal from the frame buffer. The transform matrix T' is applied to the reverse address generator 18 by a user interface 19, and defines the nature of the transform that is effected by the reverse transform system. If, for example, it is desired to effect a transformation in which the input scene is displaced diagonally upwards and to the left by an amount equal to the inter-pixel pitch in the diagonal direction, the transform matrix would be such that the memory address (X', Y') that is generated in response to the display address (X, Y) would be (X+1, Y+1), assuming that the origin of the coordinate system is in the upper left corner of the input and output scene, and values of X and Y increase to the right and downwards respectively. In the general case, it is not sufficient for the values of X' and Y'0 to be related to X and Y by addition or subtraction of integers, and therefore the memory address coordinates X' and Y' have more significant digits than the display address coordinates X and Y. The reverse addresses are applied not only to the frame buffer 12 but also to a video interpolator 20. For each reverse address (X', Y'), the frame buffer outputs the respective digital words representing an array of pixels surrounding the point defined by the reverse address (X', Y'). For example, the data words representing the four pixels nearest the point defined by the address (X', Y') might be provided. These four data words are applied to the interpolator 20, and the interpolator combines these four digital words into a single digital output word based on the fractional portion of the address (X', Y'). For example, using decimal notation, if the least significant digit of each coordinate X and Y is unity but the least significant digit of the coordinates X' and Y' is one-tenth, and the counter 16 generates the read address (23, 6) which is converted to a reverse address (56.3, 19.8) by being multiplied by the transform matrix T', the frame buffer 12 might respond to the reverse address (56.3, 19.8) by providing the digital words stored at the addresses (56, 19), (56, 20), (57, 19) and (57, 20). The interpolator 20 combines these four words into a single digital output word by weighting them 3:7 in the horizontal direction and 8:2 in the vertical direction. This digital word defines the value that is to be generated at the location of the output screen that is defined by the display address (23, 6).

The range of possible reverse addresses is greater than the range of memory addresses defining locations in the frame buffer 12, so that a validly-generated reverse address might define a location that does not exist in the frame buffer's address space. Therefore, the reverse addresses are also applied to an address limit detector 22 which responds to an invalid reverse address (an address which defines a location outside the address space of the frame buffer 12) by providing a signal which causes a video blanker 24 to inhibit the output signal of the frame buffer.

In parallel with the video channel comprising the video frame buffer 12, the video interpolator 20 and the video blanker 24 is a key channel comprising a key frame buffer 26, a key interpolator 28 and a key blanker 30. A key signal that is applied to the key channel provides opacity information about the foreground video signal applied to the video channel. This opacity information defines where and the extent to which a background scene represented by a background video signal can be seen in a composite picture (FIG. 1(c)) formed by mixing the foreground and background video signals under the influence of the key signal. Outside the boundaries of the foreground objects, the foreground scene is transparent (key=0) and the background scene is seen without modification by the foreground scene. If a foreground object is fully opaque key=1), the background scene is fully obscured by the foreground object, but if a foreground object is only partially transparent (0<key <1) the background video signal is mixed with the foreground video signal in proportion to the value of the key. Because the foreground scene is transformed by the video channel, it is necessary to transform the key in the identical manner in order to maintain congruence between the foreground scene and the key. Therefore, the key signal is processed in the key channel in the same way as the foreground signal is processed in the video channel. Thus, the key signal undergoes the same spatial transformation and interpolation as the foreground signal, and is subject to the same address limit blanking.

The transform matrix T' must be the mathematical inverse of the desired spatial transform T, and it is for this reason that the reverse transform system is known as such.

When a television picture is composed of a foreground scene and a background scene, special effects are often used to make the picture appear more realistic, i.e. so that it does not look as if it had been composed of two (or more) separate scenes. Among the possible effects are shadow effects. In the FIG. 3(a) picture, the foreground scene is a vertical column 40 and the background scene is a vertical surface 43 of uniform luminance behind the column. Because the FIG. 3(a) picture is composed of two separate scenes, the column 40 does not cast a shadow on the vertical surface. However, the video of the background scene can be selectively reduced in order to simulate the appearance of a shadow 42 (FIG. 3(b)). This can be accomplished using a conventional digital video effects device.

A digital video effects device may also be used to effect a spatial transformation of the combined foreground (object plus shadow) scene. The desired background scene is first recorded on videotape. A shadow is simulated by applying a key signal that defines the area of the background scene that is to be obscured by the foreground object to the key input of the effects device and a full field shadow matte signal, typically representing the color black, to the video input of the effects device. The output signal of the effects device is a shadow signal representing a black area of the same size and shape as the foreground object but spatially transformed in accordance with the desired transformation of the foreground object and also offset to simulate projection into the plane of the background scene. The shadow is recorded over the background scene. Then, the foreground signal is applied to the video input of the effects device in lieu of the shadow matte signal, and the foreground scene is spatially transformed in the same manner as the shadow but is not additionally offset. The transformed foreground scene is recorded over the combined background scene and shadow. Alternatively, if two video effects devices are available, the shadow matte signal and the foreground signal are applied to the respective video inputs, and the key signal is applied to the key inputs of both effects devices. The foreground scene is transformed in one effects device and the transformed and offset shadow is generated by the other effects device, and the output signals of the effects devices are combined and recorded over the background scene.

The video effects devices that are available at present do not enable a signal representing the shadow of a spatially transformed object to be generated without carrying out two processing operations in a video effects device. If two effects devices are available, the two processing operations may be performed concurrently, but nevertheless two processing operations must be performed.

SUMMARY OF THE INVENTION

In a preferred embodiment of the present invention, an input video signal representative of a foreground scene and an input key signal representing the opacity of the foreground scene are processed. A spatial transform operation is carried out on the input video signal so as to generate a transformed video signal. The input key signal comprises a stream of digital data words that are written into a key frame buffer. A first sequence of address words (X, Y) is generated, and a transform operation is carried out on the first sequence of address words to generate a second sequence (X', Y'). The second sequence of address words is employed to read digital data words from the key frame buffer so as to generate a first transformed key signal. The transform that was carried out on the first sequence of address words is such that the first transformed key signal is spatially transformed with respect to the input key signal in the same manner as the transformed video signal is spatially transformed with respect to the input video signal. The second sequence of address words is modified so as to generate a third sequence of address words, and the third sequence of address words is used to read digital data words from the key frame buffer and generate a second transformed key signal. The transformed video signal is combined with the first and second transformed key signals.

BRIEF DESCRIPTION OF THE DRAWINGS

For a better understanding of the invention, and to show how the same may be carried into effect, reference will now be made, by way of example, to the accompanying drawings in which:

FIGS. 3a and 3b are a series of screens illustrating shadow effects,

FIGS. 5a–5e are a series of screens illustrating operation of the FIG. 4 system.

DETAILED DESCRIPTION

Figure 1A:
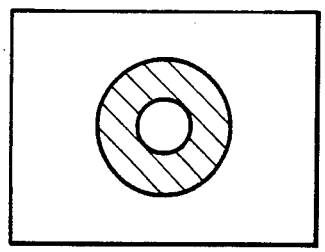
FIGS. 1a–1e are a series of screens illustrating transformation of a foreground scene.
Figure 1B:
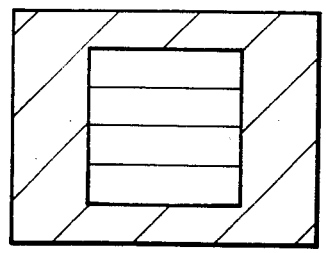
Figure 1C:
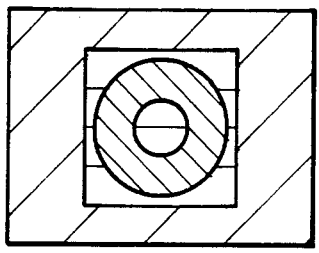
Figure 1D:
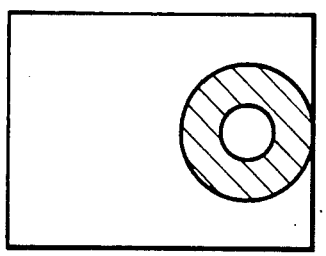
Figure 1E:
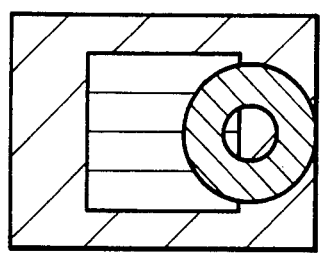
Figure 2:
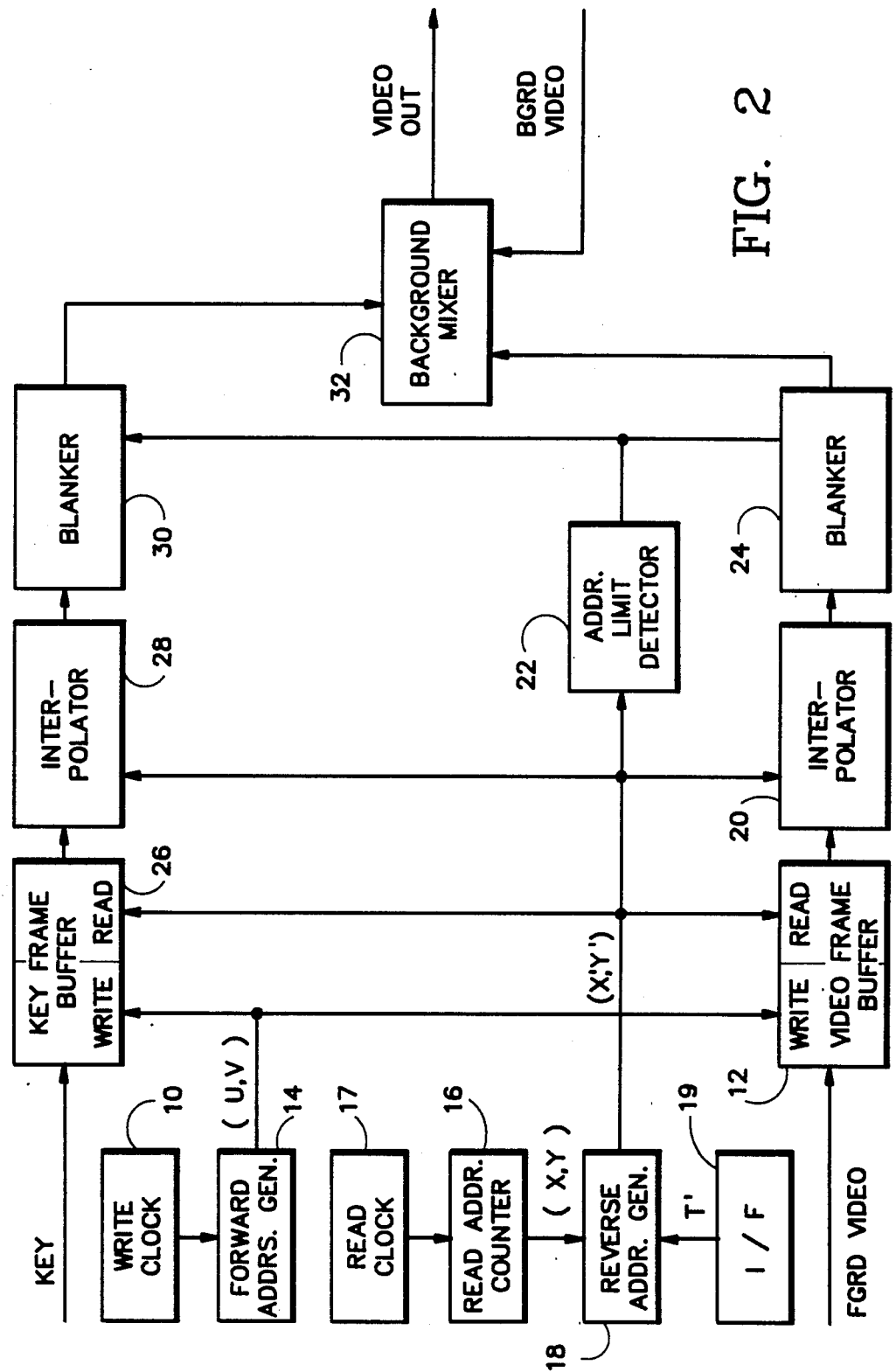
FIG. 2 is a block diagram of a reverse transform system.
Figure 4:
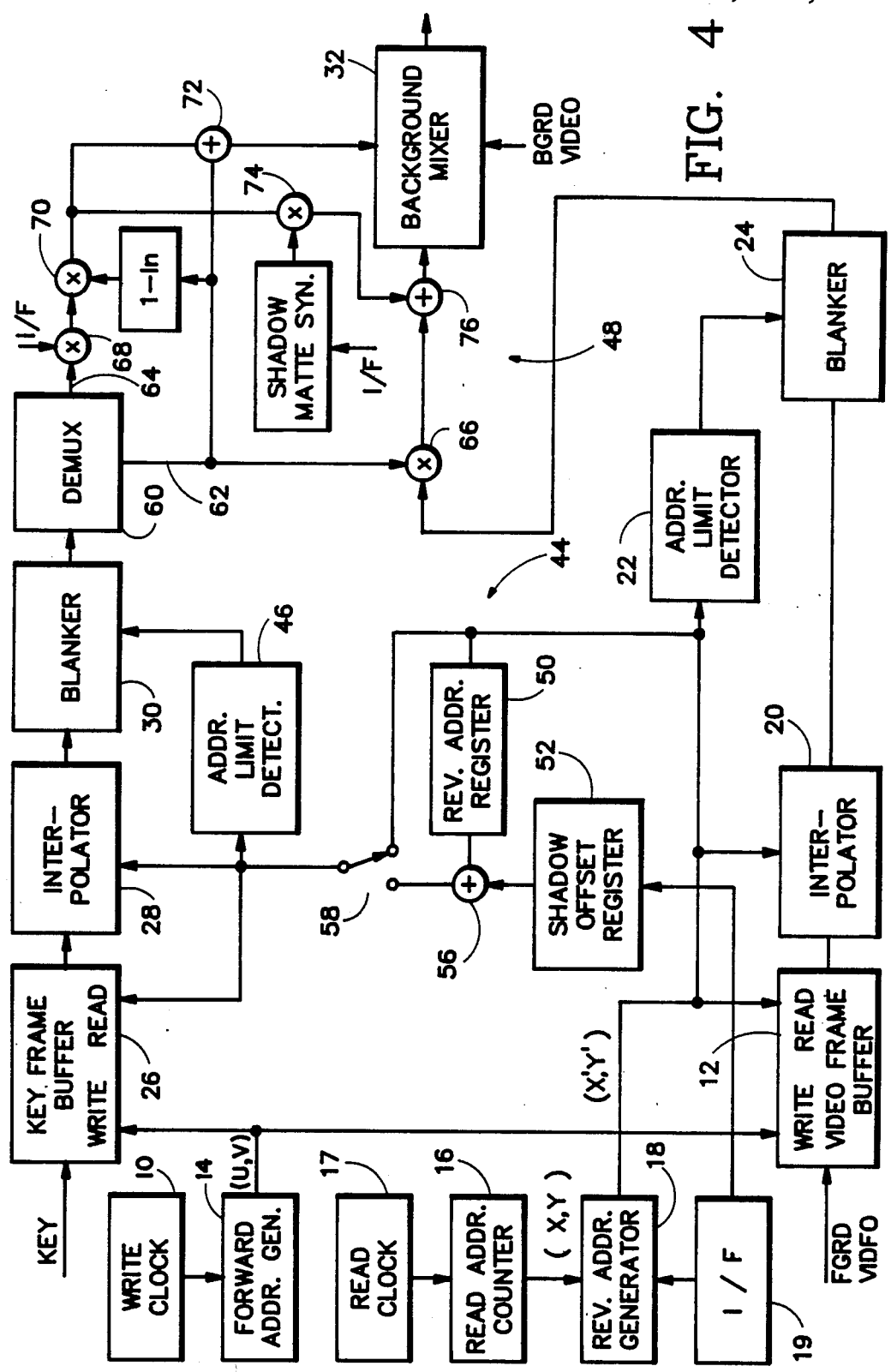
FIG. 4 is a block diagram of a special effects system embodying the present invention.

The special effects system illustrated in FIG. 4 is similar to the reverse transform system illustrated in FIG. 2 except that it includes a shadow address generator 44 that is interposed between the reverse address generator 18 and the key frame buffer 26 and the key interpolator 28. The output of the address limit detector 22 is not applied to the key blanker 30; instead a second address limit detector 46 is connected between the shadow address generator and the key blanker. Also, a shadow processor 48 is connected between the key and video blankers and the background mixer.

The shadow address generator 44 receives the sequence of reverse address words generated by the reverse address generator 18, and stores each of these words temporarily in a reverse address register 50. The shadow address generator also receives shadow offset words from the user interface 19 and stores them in a shadow offset register 52. The shadow offset words represent the spatial relationship between the foreground object and the desired shadow. For example, if the foreground object is a vertical column and the background scene will be a vertical wall the shadow that would be generated on the wall due to a light source that is behind, to the left of and above the viewpoint would be to the right of and lower than the foreground object. In this case, the shadow offset words would represent a displacement upwards and to the left. The shadow address generator also includes a summation circuit 56 which forms the sum of the words stored in the registers 50 and 52, and a multiplexer 58 which selects the output of the summation circuit 56 and the output of the reverse address generator 18 in alternating fashion so as to form two interleaved address signals, one composed of the reverse address words and the other composed of the shadow address words formed by summing the reverse address words and the corresponding shadow offsets words.

The two interleaved address signals are applied to the key frame buffer and interpolator, which provide two interleaved key signals to the key blanker 30. The second address limit detector 46 also receives the two interleaved address signals and applies an inhibit signal to the key blanker 30 if either address signal is invalid. The two interleaved key signals comprise a transformed key signal identical to that provided by the key channel of the FIG. 2 reverse transform system and a shadow key signal. The transformed key signal defines the opacity of the spatially transformed foreground scene. In the simple case illustrated in FIG. 5(a), in which the foreground scene is an opaque vertical column and at all points outside the boundary of the column the picture is to be provided by the background scene the input key signal has the value 1 inside the boundary of the column in the foreground scene and has the value 0 elsewhere. The transformed key signal has the value 1 at locations that are within the boundary of the spatially transformed column and has the value 0 elsewhere (FIG. 5(b)) as indicated by vertical shading representing a key value of 1 and horizontal shading representing a key value of 0.

The shadow key signal is the same as the transformed key signal except that the column is further displaced in accordance with the shadow offset words. In the case of the example described above in connection with the generation of the interleaved address signals, the key defined by the shadow key signal might have the form indicated in FIG. 5(c). Although the shadow offset words represent a displacement upwards and to the left, the reverse nature of the transform system results in the key defined by the shadow key signal being displaced downwards and to the right (in the source space). It will be seen that in FIG. 5(c) the key has been both projected into the plane of the vertical wall, to define the outline of the simulated shadow, and rotated through 90°, in accordance with the transform performed on the column. Thus, the shadow outline follows the foreground object when the foreground video signal is transformed and therefore is below and to the left of the transformed foreground object.

The shadow processor receives the video signal from the video channel and the interleaved key signals from the key channel. The two key signals received from the key channel are demultiplexed and time-interpolated in a demultiplexer/interpolator 60 to separate the transformed key signal, provided at a terminal 62, and the shadow key signal, provided at a terminal 64. The foreground video signal is multiplied by the transformed key signal in a multiplier 66 in order to provide a foreground object signal in which undesired portions of the foreground scene have been masked off. At points outside the boundary of the transformed column, the foreground object signal is driven to zero. The shadow key signal is applied to an opacity multiplier 68, in which the shadow key signal is multiplied by a factor that depends on the desired attenuation of the background video. The attenuated shadow key signal is then multiplied in a further multiplier 70 by the complement of the transformed key signal, so that the shadow key ignal is driven to zero for all points of the output screen for which the transformed key signal is one (FIG. 5(d)). The cropped shadow key signal provided by the multiplier 70 is then summed with the transformed key signal in a summation circuit 72 to provide an output key signal (FIG. 5(e)), and is also applied to a fourth multiplier 74. In the fourth multiplier, the cropped shadow key signal is multiplied by a shadow matte signal. The shadow matte signal is a full field video signal representing a solid color, generally black, determined by signals received from the user interface 19. The result of this multiplication is that the output signal of the multiplier 74 is a synthesized video signal that represents an object having the shape defined by the cropped shadow key signal and having a color determined by the shadow matte signal. This synthesized shadow signal is then applied to a summation circuit 76 which adds the shadow signal to the foreground object signal provided by the multiplier 66 and the resulting output foreground video signal represents a transformed foreground object and a shadow that is of the correct geometry, of an opacity determined by the opacity factor applied to the multiplier 68, and of a hue determined by the shadow matte signal. The foreground video signal provided by the summation circuit 76 is a shaped video signal, since it is composed of two component video signals which have been multiplied by their respective key signals.

The output foreground video signal and the output key signal generated by the shadow processor are applied to the background mixer 32, which also receives a background video signal. The background mixer combines the foreground scene with the background scene in accordance with the value of the output key signal, and provides a full field video output signal.

It will be appreciated that the present invention is not restricted to the particular method and apparatus that have been described with reference to the drawings, and that variations may be made therein without departing from the scope of the invention as defined in the appended claims and equivalents thereof. In particular, although it has been assumed above for the sake of clarity that the key signal has only two possible values (zero and one), in general the key signal would not be a simple binary signal but might have as many as 1024 possible levels between zero and one. By providing a key signal having values between zero and one, it is possible to accommodate partially transparent foreground objects, such as smoke and glass, and permit the background scene to be viewed through such objects. The invention is not restricted to use with a reverse transform system. By using two sequences of digital address words to write the key signal into respective key frame buffers and using a single sequence of address words to read digital words from the two key frame buffers, a forward transform system which generates a transformed key signal and a shadow key signal may be implemented. The invention is not restricted to use with a frame-based transform system and may be applied also to a field-based transform system.

I claim:

1. A method of processing an input video signal representative of a scene and an input key signal representing the opacity of the scene and comprising a stream of digital data words, said method comprising the following steps, not necessarily in the order stated
    carrying out a spatial transform operation on the input video signal so as to generate a transformed video signal,
    generating a first sub-sequence of address words
    modifying the first sub-sequence of address words to generate a second sub-sequence of address words,
    using the first and second sub-sequences of address words as a first address signal for carrying out a first memory access operation on a key frame buffer, and
    carrying out a second memory access operation on the key frame buffer using a second address signal,
    one of said memory access operations being the operation of writing digital words of said stream into the key frame buffer and the other memory access operation being the operation of reading the digital words from the key frame buffer to generate first and second transformed key signals and the first transformed key signal being spatially transformed with respect to the input key signal in the same manner as the transformed video signal is spatially transformed with respect to the input video signal, and the method also comprising
    combining the transformed video signal with the first and second transformed key signals.

2. A method of processing a video signal representative of a scene and an input key signal comprising a stream of digital data words, said method comprising writing the stream of digital data words into a key frame buffer, generating a first sequence of address words, using the first sequence of address words to read digital data words from the key frame buffer so as to generate a first output key signal, modifying the first sequence of address words to generate a second sequence of address words, using the second sequence of address words to read digital words from the key frame buffer and generate a second output key signal and combining the video signal with the first and second output key signals.

3. A method of processing an input video signal representative of a scene and an input key signal representing the opacity of the scene and comprising a stream of digital data words, said method comprising carrying out a spatial transform operation on the input video signal so as to generate a transformed video signal, writing the stream of digital data words into a key frame buffer, generating a first sequence of address words carrying out a transform operation on the first sequence of address words so as to generate a second sequence of address words employing the second sequence of address words to read digital data words from the key frame buffer so as to generate a first transformed key signal, the transform that was carried out on the first sequence of address words being such that the first transformed key signal is spatially transformed with respect to the input key signal in the same manner as the transformed video signal is spatially transformed with respect to the input video signal, and the method also comprising modifying the second sequence of address words to generate a third sequence of address words, using the third sequence of address words to read digital words from the key frame buffer and generate a second transformed key signal, and combining the transformed video signal with the first and second transformed key signals.

4. A method according to claim 3, wherein the input video signal comprises a second stream of digital words and is transformed by writing the second stream of digital words into a video frame buffer and employing the second sequence of address words to read digital words from the video frame buffer.

5. A method according to claim 3, wherein digital words are read from the key frame buffer in alternating fashion employing the second and third sequences of address words, whereby the first and second transformed key signals are time multiplexed, and the method also comprises demultiplexing the first and second transformed key signals.

6. A method according to claim 3, further comprising multiplying the transformed video signal by the first transformed key signal to generate a foreground object signal, synthesizing a matte video signal from the second transformed key signal, and additively combining the foreground object signal and the matte video signal to provide an output video signal.

7. A method according to claim 3, comprising multiplying the second transformed key signal by an opacity factor and multiplying the resulting signal by the complement of the first transformed key signal to generate a cropped transformed key signal, and additively combining the first transformed key signal and the cropped transformed key signal to generate an output key signal.

8. A method according to claim 7, comprising multiplying the transformed video signal by the first transformed key signal to generate a foreground object signal, multiplying the cropped transformed key signal by a color signal to generate a color matte video signal, and additively combining the foreground object signal and the color matte video signal to provide an output video signal.

9. A method according to claim 8, comprising combining the output video signal with a second video signal in accordance with the value of the output key signal.

10. Apparatus for processing an input video signal representative of a scene and a digital input key signal representing the opacity of the scene and comprising a stream of digital data words, the apparatus comprising means for carrying out a spatial transform operation on the input video signal so as to generate a transformed video signal, a key frame buffer, means for writing the stream of digital data words into the key frame buffer, means for generating a first sequence of address words, means for carrying out a transform operation on the first sequence of address words to generate a second sequence of address words. means for modifying the second sequence of address words to generate a third sequence of address words, and means for reading the digital data words from the key frame buffer employing the second and third sequences of address words so as to generate first and second transformed key signals, the transform carried out on the first sequence of address words to arrive at the second sequence of address words being such that the first transformed key signal is spatially transformed with respect to the input key signal in the same manner as the transformed video signal is transformed with respect to the input video signal.

11. Apparatus according to claim 10, further comprising processor means for combining the transformed video signal with the first transformed key signal and the second transformed key signal.

12. Apparatus according to claim 11, wherein the processor means comprise a first multiplier for multiplying the transformed video signal by the first transformed key signal to generate a foreground object signal, means for synthesizing a matte video signal from the second transformed key signal, and means for additively combining the foreground object signal and the matte video signal to provide an output video signal.

13. Apparatus according to claim 11, wherein the processor means comprise a first multiplier for multiplying the second transformed key signal by an opacity factor, a second multiplier for multiplying the output signal of the first multiplier by a complement of the first transformed key signal to generate a cropped transformed key signal, and means for additively combining the first transformed key signal and the cropped transformed key signal to generate an output key signal.

14. Apparatus according to claim 10, wherein the means for reading the digital data words from the key frame buffer comprise a multiplexer for selecting address words of the second and third sequences in alternating fashion, whereby the first and second transformed key signals are interleaved.

15. Apparatus according to claim 14, wherein the means for modifying the second sequence of address words comprise a first register for temporarily storing a word of the second sequence, a second register for storing an offset word, and summation means for summing the contents of the first and second registers.

* * * * *